I. KENNEDY.
Revolving Moldboard.
No. 58,431.  Patented Oct. 2. 1866.
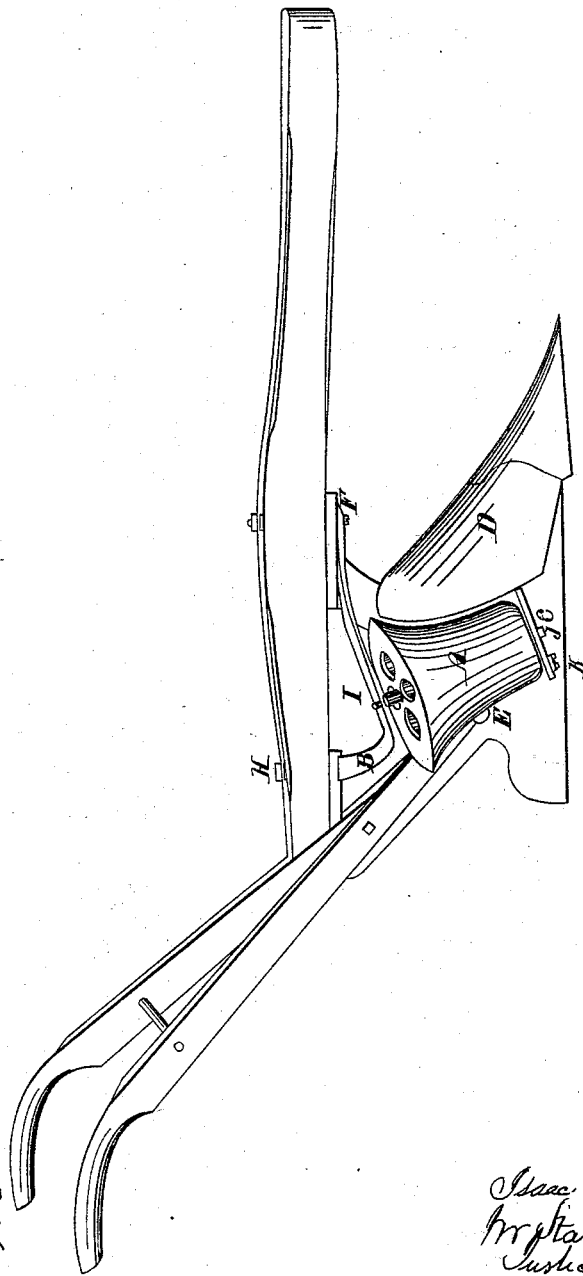

UNITED STATES PATENT OFFICE.

ISAAC KENNEDY, OF ITHACA, NEW YORK.

IMPROVEMENT IN PLOWS.

Specification forming part of Letters Patent No. 58,431, dated October 2, 1866.

*To all whom it may concern:*

Be it known that I, ISAAC KENNEDY, of the town of Ithaca, in the county of Tompkins and State of New York, have invented an Improvement in Plows; and I do hereby declare that the following is a full and exact description thereof, reference being had to the accompanying drawing, and to the letters of reference marked thereon.

My improvement relates, mainly, to the posterior part of the mold-board, and my object is to relieve the draft on that part of it, and also to control and vary the eversion of the furrow. For this purpose I use a conical wheel, and so shape it that it shall accomplish my designs.

If I wish to evert the sod or soil, I set the wheel well outward at the upper part. If I wish to leave the sod or soil raised by the plow on its edge, I set the top of the wheel not so far over from the center of the plow. If I wish to throw the soil over to the utmost extent on the top of the other furrows, I set the wheel out to its utmost extent. For these and similar dispositions of the furrow I have arranged frames and set-screws to regulate the action of my mold-board wheel, both at the top and bottom of it. This is apparent in the figure, wherein—

Figure 1 is a perspective view.

A is my wheel; B, the frame at the top, and C, the frame at the bottom; and D, the immovable mold-board in front of the wheel, which is so shaped as to fit the wheel in whatever position or inclination it is placed. The rest of the plow is made in the ordinary manner, except the handles, which meet at E on the land-rest, and are both embraced in one eye cast in the land-rest.

The frame B, at the top, is a plate or flat bar slotted at each end, so that by the nut F at the front end it is adjustable, and by a nut on the end of the bolt H it is adjustable at the other end, thus giving any desirable inclination and power to the wheel turning on its axis in the said frame.

In the lower frame J is a journal in a part of the frame, which is pivoted beneath the immovable mold-board D, which frame connects by bolt and nut with an arm, K, from the land-rest, so that this end of the wheel is also adjustable.

Either at the back part of the wheel, or cast on or attached to the forward mold-board, I use, when desirable, a scraper to free the wheel.

The use of my invention is apparent to those skilled in the art to which it appertains.

I claim—

1. Making the wheel at the rear end of the mold-board adjustable by means of a frame or other devices at the top and bottom of the said wheel, one or both, by means of which I am able to evert, set on edge, throw completely over, or otherwise regulate the furrow by the use of the said wheel and frames, as described.

2. The combination of the wheel, or equivalent device, and frames with the mold-board and the V-shaped handles, meeting in one eye on the land-rest, the same making a whole, as described.

3. So combining together the wheel and the immovable part of the mold-board, and shaping each to the other, that they shall maintain a constant relation to each other in whatever position the wheel may be placed, as described.

ISAAC KENNEDY.

Witnesses:
SAMUEL J. PARKER,
EDGAR HUSON.